April 15, 1952 — D. E. STAINTON — 2,592,757
PARALLEL WEDGE GAUGE
Filed Feb. 24, 1948
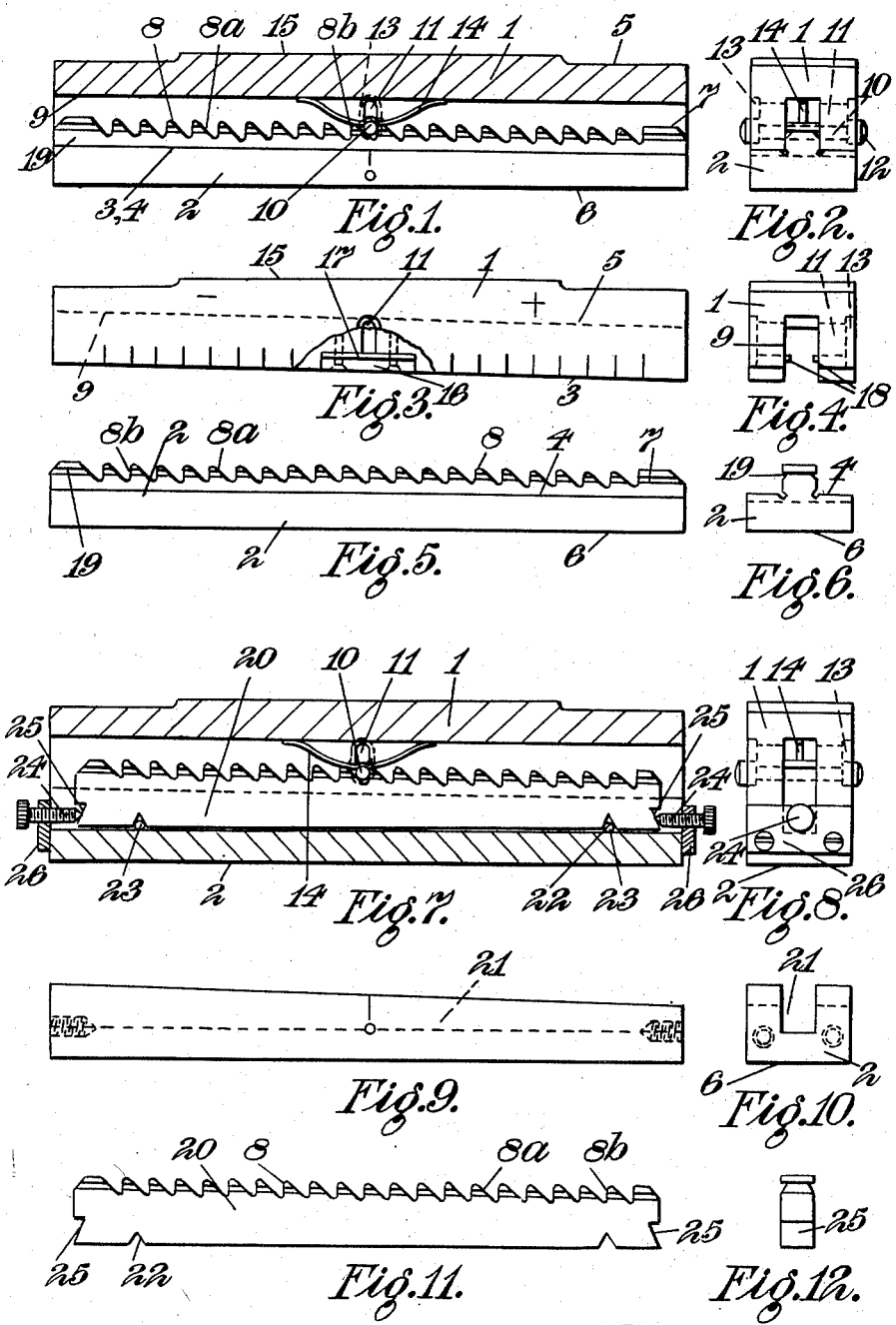
Inventor
D. E. Stainton Patented Apr. 15, 1952

2,592,757

UNITED STATES PATENT OFFICE 2,592,757

PARALLEL WEDGE GAUGE

Dudley Ernest Stainton, Rickmansworth, England

Application February 24, 1948, Serial No. 10,326
In Great Britain February 8, 1944

Section 1, Public Law 690, August 8, 1946
Patent expires February 8, 1964

5 Claims. (Cl. 33—162)

This invention relates to gauging or like devices of the type comprising a pair of elements, having parallel gauging faces and co-operating surfaces inclined to said parallel faces whereby relative sliding movement of the elements along the inclined surfaces causes variations in the distance between the parallel faces.

One object of the present invention is to provide an improved adjustable gauge of the type above set forth which is of great accuracy and in which the operation of adjusting the elements is quick and provides a positive location of the elements in their adjusted relation.

The invention consists in a precision adjustable slip gauge comprising a pair of elements having parallel gauging faces, co-operating contacting faces inclined to said parallel gauging faces, the elements being relatively slidable along the inclined surfaces to cause variations in the distance between the parallel gauging faces, one of said elements having a regular series of recesses extending in the direction of said relative movement, the pitch of said recesses conforming to increments of the nominal height of the gauge, the other element having abutment means displaceable in a direction normal to the inclined surfaces, said abutment means engaging in said recesses to hold the elements in longitudinal adjusted relation and being movable automatically during at least one direction of said sliding movement.

The recesses may comprise a series of buttress teeth each having a face located at right angles to the parallel faces of the gauge, and the abutment means may comprise a headed cross pin displaceable in a slot disposed normal to the gauging face.

According to an alternative form the recesses may be of V-shape into which a spring pressed V-shaped plunger engages.

The recesses or teeth may be formed integral with one element or may be arranged on a bar and secured to said element.

The cross pin may be spring controlled and be provided with manually operated knobs or buttons for removing it from the recesses or teeth when desired.

When the recesses or teeth are formed in an independent bar such may be arranged to have limited end adjustment relatively to its supporting element.

Means may be provided for preventing separation of the elements.

In the accompanying drawings:

Figure 1 is a side view partly in section of a gauge according to the invention, Figure 2 is an end view, Figure 3 is a side view of the upper element, Figure 4 is an end view of the element, Figures 5 and 6 are side and end views of the lower element, Figures 7 and 8 are sectional elevation and end elevation of a modification, Figures 9 and 10 are side and end views of the lower element of the modification, and Figures 11 and 12 are side and end views of the modified toothed bar.

In carrying the invention into effect according to one convenient mode by way of example, the gauge comprises upper and lower elements 1 and 2 adapted to slide longitudinally with respect to one another on the co-operating inclined surfaces 3 and 4 whereby the distance between the parallel faces 5 and 6 or height of the gauge may be varied.

The parallel gauging faces 5 and 6, and the inclined surfaces 3 and 4 are hardened and lapped.

For the purpose of holding the elements 1 and 2 in their various adjusted positions the lower element is provided with a central blade or tongue 7 the upper surface of which is provided with a regular series of saw teeth 8 having inclined faces 8a and 8b at right angles to the face 6.

The blade 7 projects into a central recess 9 in the upper element 1 with a sliding fit avoiding side play. The crests of the teeth 8 are spaced from the base of the recess 9.

Co-operating with the saw teeth 8 is a cross pin 10 located in a slot 11 in the upper element. The pin 10 is provided with end knobs or buttons 12 which seat partly in recess 13. By means of the buttons 12 the pin 10 may be manually moved in the slot 11 to release it from the teeth 8. The pin 10 may ride in the slot by gravity action or may be spring controlled by a leaf spring 14 secured to the upper element. Instead of the teeth 8 being formed at the top of the blade 7 they may be arranged at the side or sides thereof.

It will be appreciated that in moving the elements 1 and 2 relatively the cross pin 11 will ride up the inclined faces 8a of the teeth and will drop in each tooth space lodging against the surface 8b whereby the location is controlled so that various values of height will be obtained depending upon the inclination of the surfaces 3 and 4 and the pitch of the teeth. In order to release the pin 10 when slidably moving the upper member 1 down the incline the pin is lifted out of the tooth space manually by the buttons 12.

The top surface of the upper element 1 may be provided with a facet 15.

The upper and lower elements 1 and 2 may be held together against separation by any suitable means which permit their sliding adjusting movements.

Thus the upper element may be provided with inserts 16 which hold spring blades 17 in position. These spring blades are provided with tongues 18 adapted to engage said grooves 19 in the blade 7. The tongues may be turned downwardly to press the elements 1 and 2 together. The inserts 16 also close the lower ends of the slots 11.

According to a modified arrangement, see Figures 7 to 12, the toothed bar or blade 20 is separate from the lower element and seats in a longitudinal recess 21 therein, the base of the recess being parallel to the face 6. The bar 20 is provided with transverse recesses 22 in which rollers 23 are located, such rollers engaging the base of the recess 21 to provide an anti-friction support for the bar.

The bar 20 is adapted for longitudinal adjustment in the recess 21 to provide initial setting or adjustment for wear. For this purpose adjusting locking screws 24 are provided at the ends of the element 2 and engage inclined end surfaces 25 of the bar 20. The screws are threaded in plates 26 secured to the element 2. The lower element may be provided with an adjustable zero plate, comprising a plate having a zero line or vernier lines and secured to the lower element by screws engaging slots in the plate, whereby the latter may be adjusted longitudinally of the element.

Various accessories such as D plugs or hemispheres may be wrung on the parallel faces of the upper and lower elements whereby radial, diametrical measurements may be made. Slips may be inserted between the D plugs and the members being wrung to the appropriate faces.

The gauge will be marked with graduations indicating the pitches on one element and a zero or adjustable zero plate on the other element, indicating for example +10 units of .0001 about the nominal height of the gauge when at zero. The nominal size and incremental value will also be shown.

Variation of the angle of inclination and in the pitch of the teeth will permit of different height values in the gauges.

The mating face of the upper element may be provided with air or dirt grooves of suitable shape.

The improved gauge according to the invention will be quick in action and give a direct reading and will not require a secondary method of measurement for the reason that knowing their nominal size the increments can be either added or subtracted from the nominal.

The gauges may be provided in different types and sizes.

I claim:

1. A precision slip gauge comprising a pair of elements having parallel gauging faces providing a nominal height to the gauge, co-operating contacting faces inclined to said parallel gauging faces, said elements being relatively slidable along the inclined surfaces, without transverse separation of the elements, to cause variations in the distance between said gauging faces and an alteration in said nominal height, a series of regularly spaced buttress teeth mounted in fixed operative relation of one of said elements and extending in the direction of said sliding movement, the pitch of said teeth conforming to uniform increments of said nominal height, each of said buttress teeth having a face at right angles to said gauging faces, the other element having a transverse slot the major axis of which lies in a plane parallel to said toothed faces, a spring biased pin mounted in said slot to lie in a space between said teeth and in engagement with one of said tooth faces to locate and hold the elements in longitudinal adjusted relation conforming to the increments of the nominal height.

2. A precision slip gauge as claimed in claim 1 wherein one of said elements is provided with a longitudinally extending tongue on its inclined face, said buttress teeth being formed in said tongue, the other of said elements having a longitudinally extending groove in its inclined face, said tongue entering said groove and having a sliding fit therein, said transverse slot being formed in the other element and intersecting said groove.

3. A precision slip gauge as claimed in claim 1 wherein said elements are provided with longitudinally extending grooves in their inclined faces, a bar rigidly secured in the groove of one element and having a part projecting beyond said inclined face, said projecting part having said buttress teeth formed thereon, said projecting part projecting into the groove of the other element and having a sliding fit therein, said transverse slot being formed in said other element and intersecting the groove therein.

4. A precision slip gauge as claimed in claim 1 wherein said elements are provided with longitudinally extending grooves in their inclined faces, a bar located in the groove of one element and adjustable longitudinally therein for initial adjustment purposes, means for rigidly securing the bar to the element in its adjusted operable position, said bar having a part projecting beyond the inclined face of said element, said buttress teeth being formed in said projecting part, said projecting part projecting into the groove of the other element and having a sliding fit therein, said transverse pin being formed in said second element and intersecting the groove therein.

5. A precision slip gauge as claimed in claim 1 wherein said spring biassed pin extends beyond the element and is provided with heads for manual engagement to move the pin from the rack to permit relative movement of the elements in one direction.

DUDLEY ERNEST STAINTON.

REFERENCES CITED

The following references are of record in the file of this patent:

UNITED STATES PATENTS

| Number | Name | Date |
|---|---|---|
| 497,854 | D'Yochet | May 23, 1893 |
| 933,773 | Maisel | Sept. 14, 1909 |
| 978,781 | Rhoads | Dec. 13, 1910 |
| 1,363,250 | Hanson | Dec. 28, 1920 |
| 1,725,898 | Chaperlo et al. | Aug. 27, 1929 |
| 1,853,134 | Mischker | Apr. 12, 1932 |

FOREIGN PATENTS

| Number | Country | Date |
|---|---|---|
| 70,670 | Switzerland | Oct. 16, 1915 |
| 592,105 | Great Britain | Sept. 8, 1947 |